US011750699B2

(12) United States Patent
Graham et al.

(10) Patent No.: US 11,750,699 B2
(45) Date of Patent: Sep. 5, 2023

(54) SMALL MESSAGE AGGREGATION (71) Applicant: MELLANOX TECHNOLOGIES TLV LTD., Raanana (IL)

(72) Inventors: Richard Graham, Knoxville, TN (US); Lion Levi, Yavne (IL); Daniel Marcovitch, Yokneam Illit (IL); Larry R. Dennison, Mendon, MA (US); Aviad Levy, Ge'alya (IL); Noam Bloch, Bat Shlomo (IL); Gil Bloch, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 25 days.

(21) Appl. No.: 17/147,487

(22) Filed: Jan. 13, 2021

(65) Prior Publication Data
US 2021/0218808 A1 Jul. 15, 2021

Related U.S. Application Data (60) Provisional application No. 62/961,232, filed on Jan. 15, 2020.

(51) Int. Cl.
*H04L 67/1097* (2022.01)
*H04L 67/60* (2022.01)

(52) U.S. Cl.
CPC .......... *H04L 67/1097* (2013.01); *H04L 67/60* (2022.05)

(58) Field of Classification Search
CPC ............................ H04L 67/1097; H04L 67/37
See application file for complete search history.

(56) References Cited

U.S. PATENT DOCUMENTS

| 4,933,969 | A | | 6/1990 | Marshall et al. |
| 5,068,877 | A | | 11/1991 | Near et al. |
| 5,325,500 | A | | 6/1994 | Bell et al. |
| 5,353,412 | A | | 10/1994 | Douglas et al. |
| 5,404,565 | A | | 4/1995 | Gould et al. |
| 5,408,469 | A | | 4/1995 | Opher et al. |
| 5,606,703 | A | | 2/1997 | Brady et al. |
| 5,944,779 | A | | 8/1999 | Blum |
| 6,041,049 | A | | 3/2000 | Brady |
| 6,115,394 | A | * | 9/2000 | Balachandran ......... H04L 69/04 370/477 |

(Continued)

OTHER PUBLICATIONS

Mellanox Technologies, "InfiniScale IV: 36-port 40GB/s Infiniband Switch Device", pp. 1-2, year 2009.

(Continued)

*Primary Examiner* — Tauqir Hussain
(74) *Attorney, Agent, or Firm* — KLIGLER & ASSOCIATES PATENT ATTORNEYS LTD (57) ABSTRACT

An apparatus includes one or more ports for connecting to a communication network, processing circuitry and a message aggregation circuit (MAC). The processing circuitry is configured to communicate messages over the communication network via the one or more ports. The MAC is configured to receive messages, which originate in one or more source processes and are destined to one or more destination processes, to aggregate two or more of the messages that share a common destination into an aggregated message, and to send the aggregated message using the processing circuitry over the communication network.

40 Claims, 4 Drawing Sheets

(56) References Cited

U.S. PATENT DOCUMENTS

| | | | |
|---|---|---|---|
| 6,370,502 B1 | 4/2002 | Wu et al. | |
| 6,438,137 B1* | 8/2002 | Turner | H04L 9/40 |
| | | | 370/466 |
| 6,483,804 B1 | 11/2002 | Muller et al. | |
| 6,507,562 B1 | 1/2003 | Kadansky et al. | |
| 6,728,862 B1 | 4/2004 | Wilson | |
| 6,857,004 B1 | 2/2005 | Howard et al. | |
| 6,937,576 B1 | 8/2005 | Di Benedetto et al. | |
| 7,102,998 B1 | 9/2006 | Golestani | |
| 7,124,180 B1 | 10/2006 | Ranous | |
| 7,164,422 B1 | 1/2007 | Wholey, III et al. | |
| 7,171,484 B1 | 1/2007 | Krause et al. | |
| 7,313,582 B2 | 12/2007 | Bhanot et al. | |
| 7,327,693 B1 | 2/2008 | Rivers et al. | |
| 7,336,646 B2 | 2/2008 | Muller | |
| 7,346,698 B2 | 3/2008 | Hannaway | |
| 7,555,549 B1 | 6/2009 | Campbell et al. | |
| 7,613,774 B1 | 11/2009 | Caronni et al. | |
| 7,636,424 B1 | 12/2009 | Halikhedkar et al. | |
| 7,636,699 B2 | 12/2009 | Stanfill | |
| 7,738,443 B2 | 6/2010 | Kumar | |
| 7,760,743 B2 | 7/2010 | Shokri et al. | |
| 8,213,315 B2 | 7/2012 | Crupnicoff et al. | |
| 8,255,475 B2 | 8/2012 | Kagan et al. | |
| 8,380,880 B2 | 2/2013 | Gulley et al. | |
| 8,510,366 B1 | 8/2013 | Anderson et al. | |
| 8,645,663 B2 | 2/2014 | Kagan et al. | |
| 8,738,891 B1 | 5/2014 | Karandikar et al. | |
| 8,761,189 B2 | 6/2014 | Shachar et al. | |
| 8,768,898 B1 | 7/2014 | Trimmer et al. | |
| 8,775,698 B2 | 7/2014 | Archer et al. | |
| 8,811,417 B2 | 8/2014 | Bloch et al. | |
| 9,110,860 B2 | 8/2015 | Shahar | |
| 9,189,447 B2 | 11/2015 | Faraj | |
| 9,294,551 B1 | 3/2016 | Froese et al. | |
| 9,344,490 B2 | 5/2016 | Bloch et al. | |
| 9,456,060 B2 | 9/2016 | Pope et al. | |
| 9,563,426 B1 | 2/2017 | Bent et al. | |
| 9,626,329 B2 | 4/2017 | Howard | |
| 9,756,154 B1 | 9/2017 | Jiang | |
| 10,015,106 B1 | 7/2018 | Florissi et al. | |
| 10,158,702 B2 | 12/2018 | Bloch et al. | |
| 10,284,383 B2 | 5/2019 | Bloch et al. | |
| 10,296,351 B1 | 5/2019 | Kohn et al. | |
| 10,305,980 B1 | 5/2019 | Gonzalez et al. | |
| 10,318,306 B1 | 6/2019 | Kohn et al. | |
| 10,425,350 B1 | 9/2019 | Florissi | |
| 10,521,283 B2 | 12/2019 | Shuler et al. | |
| 10,528,518 B2 | 1/2020 | Graham et al. | |
| 10,541,938 B1 | 1/2020 | Timmerman et al. | |
| 10,547,553 B2 | 1/2020 | Shattah et al. | |
| 10,621,489 B2 | 4/2020 | Appuswamy et al. | |
| 11,088,971 B2 | 8/2021 | Brody et al. | |
| 2002/0010844 A1 | 1/2002 | Noel et al. | |
| 2002/0035625 A1 | 3/2002 | Tanaka | |
| 2002/0150094 A1 | 10/2002 | Cheng et al. | |
| 2002/0150106 A1 | 10/2002 | Kagan et al. | |
| 2002/0152315 A1 | 10/2002 | Kagan et al. | |
| 2002/0152327 A1 | 10/2002 | Kagan et al. | |
| 2002/0152328 A1 | 10/2002 | Kagan et al. | |
| 2002/0165897 A1 | 11/2002 | Kagan et al. | |
| 2003/0018828 A1 | 1/2003 | Craddock et al. | |
| 2003/0061417 A1 | 3/2003 | Craddock et al. | |
| 2003/0065856 A1 | 4/2003 | Kagan et al. | |
| 2003/0120835 A1 | 6/2003 | Kale et al. | |
| 2004/0030745 A1 | 2/2004 | Boucher et al. | |
| 2004/0062258 A1 | 4/2004 | Grow et al. | |
| 2004/0078493 A1 | 4/2004 | Blumrich et al. | |
| 2004/0120331 A1 | 6/2004 | Rhine et al. | |
| 2004/0123071 A1 | 6/2004 | Stefan et al. | |
| 2004/0252685 A1 | 12/2004 | Kagan et al. | |
| 2004/0260683 A1 | 12/2004 | Chan et al. | |
| 2005/0097300 A1 | 5/2005 | Gildea et al. | |
| 2005/0122329 A1 | 6/2005 | Janus | |
| 2005/0129039 A1 | 6/2005 | Biran et al. | |
| 2005/0131865 A1 | 6/2005 | Jones et al. | |
| 2005/0223118 A1 | 10/2005 | Tucker et al. | |
| 2005/0281287 A1 | 12/2005 | Ninomi et al. | |
| 2006/0282838 A1 | 12/2006 | Gupta et al. | |
| 2007/0127396 A1 | 6/2007 | Jain et al. | |
| 2007/0127525 A1 | 6/2007 | Sarangam et al. | |
| 2007/0162236 A1 | 7/2007 | Lamblin et al. | |
| 2008/0040792 A1* | 2/2008 | Larson | H04L 12/4641 |
| | | | 726/14 |
| 2008/0104218 A1 | 5/2008 | Liang et al. | |
| 2008/0126564 A1 | 5/2008 | Wilkinson | |
| 2008/0168471 A1 | 7/2008 | Benner et al. | |
| 2008/0181260 A1 | 7/2008 | Vonog et al. | |
| 2008/0192750 A1 | 8/2008 | Ko et al. | |
| 2008/0219159 A1 | 9/2008 | Chateau et al. | |
| 2008/0244220 A1 | 10/2008 | Lin et al. | |
| 2008/0263329 A1 | 10/2008 | Archer et al. | |
| 2008/0288949 A1 | 11/2008 | Bohra et al. | |
| 2008/0298380 A1 | 12/2008 | Rittmeyer et al. | |
| 2008/0307082 A1 | 12/2008 | Cai et al. | |
| 2009/0037377 A1 | 2/2009 | Archer et al. | |
| 2009/0063816 A1 | 3/2009 | Arimilli et al. | |
| 2009/0063817 A1 | 3/2009 | Arimilli et al. | |
| 2009/0063891 A1 | 3/2009 | Arimilli et al. | |
| 2009/0182814 A1 | 7/2009 | Tapolcai et al. | |
| 2009/0240838 A1 | 9/2009 | Berg et al. | |
| 2009/0247241 A1 | 10/2009 | Gollnick et al. | |
| 2009/0292905 A1 | 11/2009 | Faraj | |
| 2009/0296699 A1 | 12/2009 | Hefty | |
| 2009/0327444 A1 | 12/2009 | Archer et al. | |
| 2010/0017420 A1 | 1/2010 | Archer et al. | |
| 2010/0049836 A1 | 2/2010 | Kramer | |
| 2010/0074098 A1 | 3/2010 | Zeng et al. | |
| 2010/0095086 A1 | 4/2010 | Eichenberger et al. | |
| 2010/0185719 A1 | 7/2010 | Howard | |
| 2010/0241828 A1 | 9/2010 | Yu et al. | |
| 2010/0274876 A1 | 10/2010 | Kagan et al. | |
| 2010/0329275 A1 | 12/2010 | Johnsen et al. | |
| 2011/0060891 A1 | 3/2011 | Jia | |
| 2011/0066649 A1 | 3/2011 | Berlyant et al. | |
| 2011/0093258 A1 | 4/2011 | Xu et al. | |
| 2011/0119673 A1 | 5/2011 | Bloch et al. | |
| 2011/0173413 A1 | 7/2011 | Chen et al. | |
| 2011/0219208 A1 | 9/2011 | Asaad | |
| 2011/0238956 A1 | 9/2011 | Arimilli et al. | |
| 2011/0258245 A1 | 10/2011 | Blocksome et al. | |
| 2011/0276789 A1 | 11/2011 | Chambers et al. | |
| 2012/0063436 A1 | 3/2012 | Thubert et al. | |
| 2012/0117331 A1 | 5/2012 | Krause et al. | |
| 2012/0131309 A1 | 5/2012 | Johnson | |
| 2012/0254110 A1 | 10/2012 | Takemoto | |
| 2013/0117548 A1 | 5/2013 | Grover et al. | |
| 2013/0159410 A1 | 6/2013 | Lee et al. | |
| 2013/0159568 A1 | 6/2013 | Shahar et al. | |
| 2013/0215904 A1 | 8/2013 | Zhou et al. | |
| 2013/0250756 A1* | 9/2013 | Johri | H04L 45/28 |
| | | | 370/228 |
| 2013/0312011 A1 | 11/2013 | Kumar et al. | |
| 2013/0318525 A1 | 11/2013 | Palanisamy et al. | |
| 2013/0336292 A1 | 12/2013 | Kore et al. | |
| 2014/0019574 A1* | 1/2014 | Cardona | G06F 15/167 |
| | | | 709/212 |
| 2014/0033217 A1 | 1/2014 | Vajda et al. | |
| 2014/0040542 A1 | 2/2014 | Kim et al. | |
| 2014/0047341 A1 | 2/2014 | Breternitz et al. | |
| 2014/0095779 A1 | 4/2014 | Forsyth et al. | |
| 2014/0122831 A1 | 5/2014 | Uliel et al. | |
| 2014/0136811 A1 | 5/2014 | Fleischer et al. | |
| 2014/0189308 A1 | 7/2014 | Hughes et al. | |
| 2014/0211804 A1 | 7/2014 | Makikeni et al. | |
| 2014/0258438 A1* | 9/2014 | Ayoub | G06F 13/28 |
| | | | 709/212 |
| 2014/0280420 A1 | 9/2014 | Khan | |
| 2014/0281370 A1 | 9/2014 | Khan | |
| 2014/0362692 A1 | 12/2014 | Wu et al. | |
| 2014/0365548 A1 | 12/2014 | Mortensen | |
| 2015/0074373 A1 | 3/2015 | Sperber et al. | |
| 2015/0106578 A1 | 4/2015 | Warfield et al. | |
| 2015/0143076 A1 | 5/2015 | Khan | |

(56) References Cited

U.S. PATENT DOCUMENTS

| | | | |
|---|---|---|---|
| 2015/0143077 A1 | 5/2015 | Khan | |
| 2015/0143078 A1 | 5/2015 | Khan et al. | |
| 2015/0143079 A1 | 5/2015 | Khan | |
| 2015/0143085 A1 | 5/2015 | Khan | |
| 2015/0143086 A1 | 5/2015 | Khan | |
| 2015/0154058 A1 | 6/2015 | Miwa et al. | |
| 2015/0178211 A1 | 6/2015 | Hiramoto et al. | |
| 2015/0180785 A1 | 6/2015 | Annamraju | |
| 2015/0188987 A1 | 7/2015 | Reed et al. | |
| 2015/0193271 A1 | 7/2015 | Archer et al. | |
| 2015/0212972 A1 | 7/2015 | Boettcher et al. | |
| 2015/0261720 A1 | 9/2015 | Kagan et al. | |
| 2015/0269116 A1* | 9/2015 | Raikin | F01N 3/103 709/212 |
| 2015/0278347 A1 | 10/2015 | Meyer et al. | |
| 2015/0347012 A1 | 12/2015 | Dewitt et al. | |
| 2015/0365494 A1* | 12/2015 | Cardona | H04L 67/62 709/223 |
| 2015/0379022 A1 | 12/2015 | Puig et al. | |
| 2016/0055225 A1 | 2/2016 | Xu et al. | |
| 2016/0092362 A1* | 3/2016 | Barron | G06F 12/0813 710/308 |
| 2016/0105494 A1 | 4/2016 | Reed et al. | |
| 2016/0112531 A1 | 4/2016 | Milton et al. | |
| 2016/0117277 A1 | 4/2016 | Raindel et al. | |
| 2016/0119244 A1 | 4/2016 | Wang et al. | |
| 2016/0179537 A1 | 6/2016 | Kunzman et al. | |
| 2016/0219009 A1 | 7/2016 | French | |
| 2016/0248656 A1 | 8/2016 | Anand et al. | |
| 2016/0283422 A1 | 9/2016 | Crupnicoff et al. | |
| 2016/0294793 A1* | 10/2016 | Larson | H04L 63/1408 |
| 2016/0299872 A1 | 10/2016 | Vaidyanathan et al. | |
| 2016/0342568 A1 | 11/2016 | Burchard et al. | |
| 2016/0352598 A1* | 12/2016 | Reinhardt | H04L 47/365 |
| 2016/0364350 A1 | 12/2016 | Sanghi et al. | |
| 2017/0063613 A1 | 3/2017 | Bloch et al. | |
| 2017/0093715 A1 | 3/2017 | McGhee et al. | |
| 2017/0116154 A1 | 4/2017 | Palmer et al. | |
| 2017/0187496 A1 | 6/2017 | Shalev et al. | |
| 2017/0187589 A1 | 6/2017 | Pope et al. | |
| 2017/0187629 A1 | 6/2017 | Shalev et al. | |
| 2017/0187846 A1 | 6/2017 | Shalev et al. | |
| 2017/0192782 A1 | 7/2017 | Valentine et al. | |
| 2017/0199844 A1 | 7/2017 | Burchard et al. | |
| 2017/0255501 A1* | 9/2017 | Shuler | G06F 9/546 |
| 2017/0262517 A1 | 9/2017 | Horowitz et al. | |
| 2017/0308329 A1 | 10/2017 | A et al. | |
| 2017/0344589 A1 | 11/2017 | Kafai et al. | |
| 2018/0004530 A1 | 1/2018 | Vorbach | |
| 2018/0046901 A1 | 2/2018 | Xie et al. | |
| 2018/0047099 A1 | 2/2018 | Bonig et al. | |
| 2018/0089278 A1 | 3/2018 | Bhattacharjee et al. | |
| 2018/0091442 A1 | 3/2018 | Chen et al. | |
| 2018/0097721 A1 | 4/2018 | Matsui et al. | |
| 2018/0115529 A1* | 4/2018 | Munger | H04L 63/0227 |
| 2018/0173673 A1 | 6/2018 | Daglis et al. | |
| 2018/0262551 A1 | 9/2018 | Demeyer et al. | |
| 2018/0278549 A1* | 9/2018 | Mula | H04L 47/39 |
| 2018/0285316 A1 | 10/2018 | Thorson et al. | |
| 2018/0287928 A1 | 10/2018 | Levi et al. | |
| 2018/0302324 A1 | 10/2018 | Kasuya | |
| 2018/0321912 A1 | 11/2018 | Li et al. | |
| 2018/0321938 A1 | 11/2018 | Boswell et al. | |
| 2018/0349212 A1 | 12/2018 | Liu et al. | |
| 2018/0367465 A1 | 12/2018 | Levi | |
| 2018/0375781 A1 | 12/2018 | Chen et al. | |
| 2019/0018805 A1 | 1/2019 | Benisty | |
| 2019/0026250 A1 | 1/2019 | Das Sarma et al. | |
| 2019/0044889 A1* | 2/2019 | Serres | H04L 47/365 |
| 2019/0065208 A1 | 2/2019 | Liu et al. | |
| 2019/0068501 A1 | 2/2019 | Schneder et al. | |
| 2019/0102179 A1 | 4/2019 | Fleming et al. | |
| 2019/0102338 A1 | 4/2019 | Tang et al. | |
| 2019/0102640 A1 | 4/2019 | Balasubramanian | |
| 2019/0114533 A1 | 4/2019 | Ng et al. | |
| 2019/0121388 A1 | 4/2019 | Knowles et al. | |
| 2019/0138638 A1 | 5/2019 | Pal et al. | |
| 2019/0141133 A1* | 5/2019 | Rajan | G06F 13/4282 |
| 2019/0147092 A1 | 5/2019 | Pal et al. | |
| 2019/0149486 A1 | 5/2019 | Bohrer et al. | |
| 2019/0149488 A1* | 5/2019 | Bansal | H04L 51/02 709/206 |
| 2019/0171612 A1* | 6/2019 | Shahar | G06F 15/17331 |
| 2019/0235866 A1 | 8/2019 | Das Sarma et al. | |
| 2019/0278737 A1* | 9/2019 | Kozomora | G06F 11/0745 |
| 2019/0303168 A1 | 10/2019 | Fleming, Jr. et al. | |
| 2019/0303263 A1 | 10/2019 | Fleming, Jr. et al. | |
| 2019/0324431 A1 | 10/2019 | Celia et al. | |
| 2019/0339688 A1 | 11/2019 | Celia et al. | |
| 2019/0347099 A1 | 11/2019 | Eapen et al. | |
| 2019/0369994 A1 | 12/2019 | Parandeh Afshar et al. | |
| 2019/0377580 A1 | 12/2019 | Vorbach | |
| 2019/0379714 A1 | 12/2019 | Levi et al. | |
| 2020/0005859 A1 | 1/2020 | Chen et al. | |
| 2020/0034145 A1 | 1/2020 | Bainville et al. | |
| 2020/0057748 A1 | 2/2020 | Danilak | |
| 2020/0103894 A1 | 4/2020 | Celia et al. | |
| 2020/0106828 A1 | 4/2020 | Elias et al. | |
| 2020/0137013 A1 | 4/2020 | Jin et al. | |
| 2020/0265043 A1 | 8/2020 | Graham et al. | |
| 2020/0274733 A1 | 8/2020 | Graham et al. | |
| 2021/0203621 A1* | 7/2021 | Ylisirniö | H04L 49/9052 |

OTHER PUBLICATIONS

Mellanox Technologies Inc., "Scaling 10Gb/s Clustering at Wire-Speed", pp. 1-8, year 2006.

IEEE 802.1D Standard "IEEE Standard for Local and Metropolitan Area Networks—Media Access Control (MAC) Bridges", IEEE Computer Society, pp. 1-281, Jun. 9, 2004.

IEEE 802.1AX Standard "IEEE Standard for Local and Metropolitan Area Networks—Link Aggregation", IEEE Computer Society, pp. 1-163, Nov. 3, 2008.

Turner et al., "Multirate Clos Networks", IEEE Communications Magazine, pp. 1-11, Oct. 2003.

Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3.1, pp. 1-868, Jun. 4, 2015.

Coti et al., "MPI Applications on Grids: a Topology Aware Approach," Proceedings of the 15th International European Conference on Parallel and Distributed Computing (EuroPar'09), pp. 1-12, Aug. 2009.

Petrini et al., "The Quadrics Network (QsNet): High-Performance Clustering Technology," Proceedings of the 9th IEEE Symposium on Hot Interconnects (HotI'01), pp. 1-6, Aug. 2001.

Sancho et al., "Efficient Offloading of Collective Communications in Large-Scale Systems," Proceedings of the 2007 IEEE International Conference on Cluster Computing, pp. 1-10, Sep. 17-20, 2007.

Nudelman et al., U.S. Appl. No. 17/120,321, filed Dec. 14, 2020.

InfiniBand Architecture Specification, vol. 1, Release 1.2.1, pp. 1-1727, Nov. 2007.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

Ben-Moshe et al., U.S. Appl. No. 16/750,019, filed Jan. 23, 2020.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

(56) References Cited

OTHER PUBLICATIONS

Gainaru et al., "Using InfiniBand Hardware Gather-Scatter Capabilities to Optimize MPI All-to-All", EuroMPI '16, Edinburgh, United Kingdom, pp. 1-13, year 2016.

Pjesivac-Grbovic et al., "Performance analysis of MPI collective operations", Cluster Computing, pp. 1-25, 2007.

Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.

Chiang et al., "Toward supporting data parallel programming on clusters of symmetric multiprocessors", Proceedings International Conference on Parallel and Distributed Systems, pp. 607-614, Dec. 14, 1998.

Danalis et al., "PTG: an abstraction for unhindered parallelism", 2014 Fourth International Workshop on Domain-Specific Languages and High-Level Frameworks for High Performance Computing, pp. 1-10, Nov. 17, 2014.

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using paramerized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

Wikipedia, "Loop unrolling," pp. 1-9, last edited Sep. 9, 2020 downloaded from https://en.wikipedia.org/wiki/Loop_unrolling.

Chapman et al., "Introducing OpenSHMEM: SHMEM for the PGAS Community," Proceedings of the Forth Conferene on Partitioned Global Address Space Programming Model, pp. 1-4, Oct. 2010.

Priest et al., "You've Got Mail (YGM): Building Missing Asynchronous Communication Primitives", IEEE International Parallel and Distributed Processing Symposium Workshops, pp. 221-230, year 2019.

Wikipedia, "Nagle's algorithm", pp. 1-4, Dec. 12, 2019.

U.S. Appl. No. 16/430,457 Office Action dated Jul. 9, 2021.

Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.

EP Application # 20216972 Search Report dated Jun. 11, 2021.

U.S. Appl. No. 16/782,118 Office Action dated Jun. 3, 2021.

U.S. Appl. No. 16/789,458 Office Action dated Jun. 10, 2021.

U.S. Appl. No. 16/750,019 Office Action dated Jun. 15, 2021.

U.S. Appl. No. 16/782,118 Office Action dated Nov. 8, 2021.

"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.

Pacheco, "A User's Guide to MPI," Department of Mathematics, University of San Francisco, CA, USA, pp. 1-51, Mar. 30, 1998.

Wikipedia, "Message Passing Interface," pp. 1-16, last edited Nov. 7, 2021, as downloaded from https://en.wikipedia.org/wiki/Message_Passing_Interface.

EP Application # 21183290.2 Search Report dated Dec. 8, 2021.

U.S. Appl. No. 16/782,118 Office Action dated Jun. 15, 2022.

U.S. Appl. No. 16/782,118 Office Action dated Sep. 7, 2022.

U.S. Appl. No. 17/495,824 Office Action dated Jan. 27, 2023.

\* cited by examiner

SMALL MESSAGE AGGREGATION

CROSS-REFERENCE TO RELATED APPLICATIONS

This application claims the benefit of U.S. Provisional Patent Application 62/961,232, filed Jan. 15, 2020, whose disclosure is incorporated herein by reference.

FIELD OF THE INVENTION

The present invention relates generally to computer networks, and specifically to process-to-process message communication over computer networks.

BACKGROUND

Parallel computation algorithms often entail frequent sending of short data messages between processors over a communication network. Efficient managing of inter-processor messages are discussed, for example, in "Efficient Algorithms for All-to-All Communications in Multiport Message-Passing Systems," Bruck et. al, IEEE Transactions On Parallel And Distributed Systems, Vol. 8, No. 11, November 1997, wherein the authors present efficient algorithms for two all-to-all communication operations in message-passing systems.

The Message Passing Interface (MPI) is the de-facto standard for message handling in distributed computing. The standard is defined by the Message Passing Interface forum (MPI), and includes point-to-point message-passing, collective communications, group and communicator concepts, process topologies, environmental management, process creation and management, one-sided communications, extended collective operations, external interfaces, I/O, some miscellaneous topics, and a profiling interface. The latest publication of the standard is "MPI: A Message-Passing Interface Standard Version 3.0," Message Passing Interface Forum, Sep. 21, 2012. For summaries of some of the main topics, see, for example, chapters 1, 3.1 through 3.4, 5.1, 6.1 and 7.1. Another commonly used distributed processing framework is OpenShmem; see, for example, "Introducing OpenSHMEM: SHMEM for the PGAS community," Chapman et. al, Proceedings of the Fourth Conference on Partitioned Global Address Space Programming Model, October 2010 (ISBN: 978-1-4503-0461-0).

SUMMARY

An embodiment of the present invention that is described herein provides an apparatus including one or more ports for connecting to a communication network, processing circuitry and a message aggregation circuit (MAC). The processing circuitry is configured to communicate messages over the communication network via the one or more ports. The MAC is configured to receive messages, which originate in one or more source processes and are destined to one or more destination processes, to aggregate two or more of the messages that share a common destination into an aggregated message, and to send the aggregated message using the processing circuitry over the communication network.

In an embodiment, the apparatus further includes a host interface for connecting to one or more local processors, and the MAC is configured to receive one or more of the messages from the one or more local processors over the host interface. Additionally or alternatively, the MAC is configured to receive one or more of the messages from one or more remote processors over the communication network, via the ports.

In a disclosed embodiment, the two or more messages share a common destination network node, and the MAC is configured to cause the processing circuitry to send the aggregated message to the common destination network node. In another embodiment, the two or more messages share a common destination path via the network, and the MAC is configured to cause the processing circuitry to send the aggregated message to the common destination path. In an embodiment, the MAC is configured to compress the messages by joining messages that are destined to neighboring address ranges defined in the common destination.

In an example embodiment, the MAC is configured to terminate aggregation of the aggregated message responsive to expiry of a timeout. In another embodiment, the MAC is configured to terminate aggregation of the aggregated message responsive to a total size of the aggregated message reaching a predefined limit. In yet another embodiment, the MAC is configured to terminate aggregation of the aggregated message responsive to receiving an aggregation termination request. Typically, the MAC is configured to aggregate the messages as part of transport-layer processing.

In some embodiments, the messages include at least read requests, and the MAC is configured to aggregate at least the read requests into the aggregated message, and, upon receiving one or more aggregated responses in response to the aggregated message, to disaggregate the one or more aggregated responses at least into multiple read responses that correspond to the read requests. In some embodiments, the MAC is configured to aggregate in the aggregated message one or more additional messages in addition to the read requests.

In some embodiments, the messages include at least one message type selected from a group of types consisting of Remote Direct Memory Access (RDMA) READ messages, RDMA WRITE messages, and RDMA ATOMIC messages. In some embodiments, the one or more ports, the processing circuitry and the MAC are included in a network device.

There is additionally provided, in accordance with an embodiment of the present invention, an apparatus including one or more ports for connecting to a communication network, processing circuitry and a message disaggregation circuit (MDC). The processing circuitry is configured to communicate messages over the communication network via the one or more ports. The MDC is configured to receive from the processing circuitry an aggregated message, which was aggregated from two or more messages originating in one or more source processes and destined to one or more destination processes, to disaggregate the aggregated message into the two or more messages, and to send the two or more messages to the one or more destination processes.

Typically, the MDC is configured to disaggregate the aggregated message as part of transport-layer processing. In some embodiments, the aggregated message includes at least read requests, the MDC is configured to disaggregate the aggregated message into at least the read requests, and the apparatus further includes a message aggregation circuit (MAC) configured to receive read responses corresponding to the read requests, to aggregate the read responses into one or more aggregated responses, and to send the one or more aggregated responses using the processing circuitry over the communication network.

In an embodiment, the MAC is configured to group the read responses in the one or more aggregated responses in a grouping that differs from the grouping of the read requests in the aggregated message. In some embodiments, the messages include at least one message type selected from a group of types consisting of Remote Direct Memory Access (RDMA) READ messages, RDMA WRITE messages, and RDMA ATOMIC messages. In some embodiments, the one or more ports, the processing circuitry and the MDC are included in a network device.

There is further provided, in accordance with an embodiment of the present invention, a method including communicating messages, which originate in one or more source processes and are destined to one or more destination processes, over a communication network. Two or more of the messages, which share a common destination, are aggregated into an aggregated message. The aggregated message is sent over the communication network.

There is also provided, in accordance with an embodiment of the present invention, a method including communicating messages over a communication network, including receiving an aggregated message, which was aggregated from two or more messages originating in one or more source processes and destined to one or more destination processes. The aggregated message is disaggregated into the two or more messages. The two or more messages are sent to the one or more destination processes.

The present invention will be more fully understood from the following detailed description of the embodiments thereof, taken together with the drawings in which:

DETAILED DESCRIPTION OF EMBODIMENTS

Overview

Parallel algorithms that generate large amounts of small data packets with a point-to-point communication semantic, such as graph algorithms, often utilize a very small portion of the available network bandwidth. Small data packets are defined to be those with payload that is similar in size or smaller than the associated network headers sent in the packet. The poor network utilization, sometimes on the order of single digit percent of the network utilization, is caused by the bandwidth needed to transfer the network headers being similar to or greater than that of the payload, and limits on the rate at which network hardware can communicate data over the network.

The main contributors to the performance degradation are:
1. Large overheads relative to the protocol overheads.
2. Limited rate at which messages can be processed by the network-interface controller.
3. Limited rate at which packets can be processed by a switch.
4. Large packet overheads relative to network packet payload size.

Embodiments of the present invention that are disclosed herein provide methods and systems for aggregating egress messages, which may reduce the overhead and improve the multi-computer system performance. In some embodiments, a Message Aggregation Circuit (MAC) is added to the egress path of network devices; the MAC may aggregate messages that share the same destination, allowing the network device to send a smaller number of larger aggregated messages, reducing the total cost of the message overhead.

In some embodiments, aggregation is performed by a network adapter in a compute node, wherein the network adapter aggregates messages generated by processes running in the compute node. This sort of aggregation is sometimes referred to as "source aggregation." In other embodiments, aggregation is carried out by a network switch, which aggregates messages received over the network. This sort of aggregation is sometimes referred to as "intermediate aggregation." Hybrid aggregation schemes, in which an aggregated message is formed from both locally generated messages and messages received over the network, are also possible. For a given message, the process generating the message is referred to herein as a "source process" and the process to which the message is destined is referred to as a "destination process". Generally, the disclosed aggregation techniques may be carried out in any suitable type of network device, e.g., network adapter, switch, router, hub, gateway, network-connected Graphics Processing unit (GPU), and the like.

The term "common destination" used for aggregation may refer to, for example, a common destination compute node, or a common destination path via the network. When aggregating messages destined to a common destination compute node, individual messages in the aggregated message may be addressed to different processors and/or processes in the common destination compute node. When aggregating messages destined to a common destination path, individual messages in the aggregated message may be addressed to different compute nodes, processors and/or processes reachable via the common destination path.

In some embodiments, the aggregation of egress messages to create an aggregated message may stop when a time limit has expired, or when a buffer size has been reached. In other embodiments, the aggregation may stop when a minimum bandwidth specification is met.

In some embodiments, an aggregation hierarchy is implemented, wherein messages within an aggregated message may be further aggregated; e.g., messages that write to neighboring segments of a memory may be aggregated to a larger message that writes into the combined memory space (such aggregation will be sometimes referred to as aggregated message compression).

Other embodiments of the present invention comprise a message disaggregation circuit (MDC), which is configured to break the aggregated messages back into the discrete original messages.

In some embodiments, aggregation is done based on the next hop in the network fabric. For example, if a network adapter sends messages to a plurality of destinations, but a group of the messages is first sent to the same switch in the communication network, the network adapter may aggregate the group of messages and send the aggregated message to the switch, which may then disaggregate the aggregated message and send the original messages to the corresponding destinations. In some embodiments, various switches in the communication network may aggregate and disaggregate messages.

Thus, in embodiments, the efficiency of message communication between network elements may be enhanced by sharing the communication overhead between groups of messages that are aggregated.

More details will be disclosed in the System Description hereinbelow, with reference to example embodiments.

System Description

Parallel computing systems in which computers that run a shared task communicate with each other over a communication network, typically comprise network-connected devices such as Network-Interface Controllers (NICs), Host Channel Adapters (HCAs), switches, routers, hubs and so on. The computers that run the shared task are typically connected to the network through a network adapter (NIC in Ethernet nomenclature, HCA in InfiniBand™ nomenclature, or similar for other communication networks); however the parallel computing tasks may also be run by computers that are coupled to other network elements such as switches.

Messages that the computers send to each other are typically sent by egress packets, which may or may not be acknowledged, using communication protocols such as Dynamic Connection (DC), Reliable Connection (RC) and others.

Figure 1:
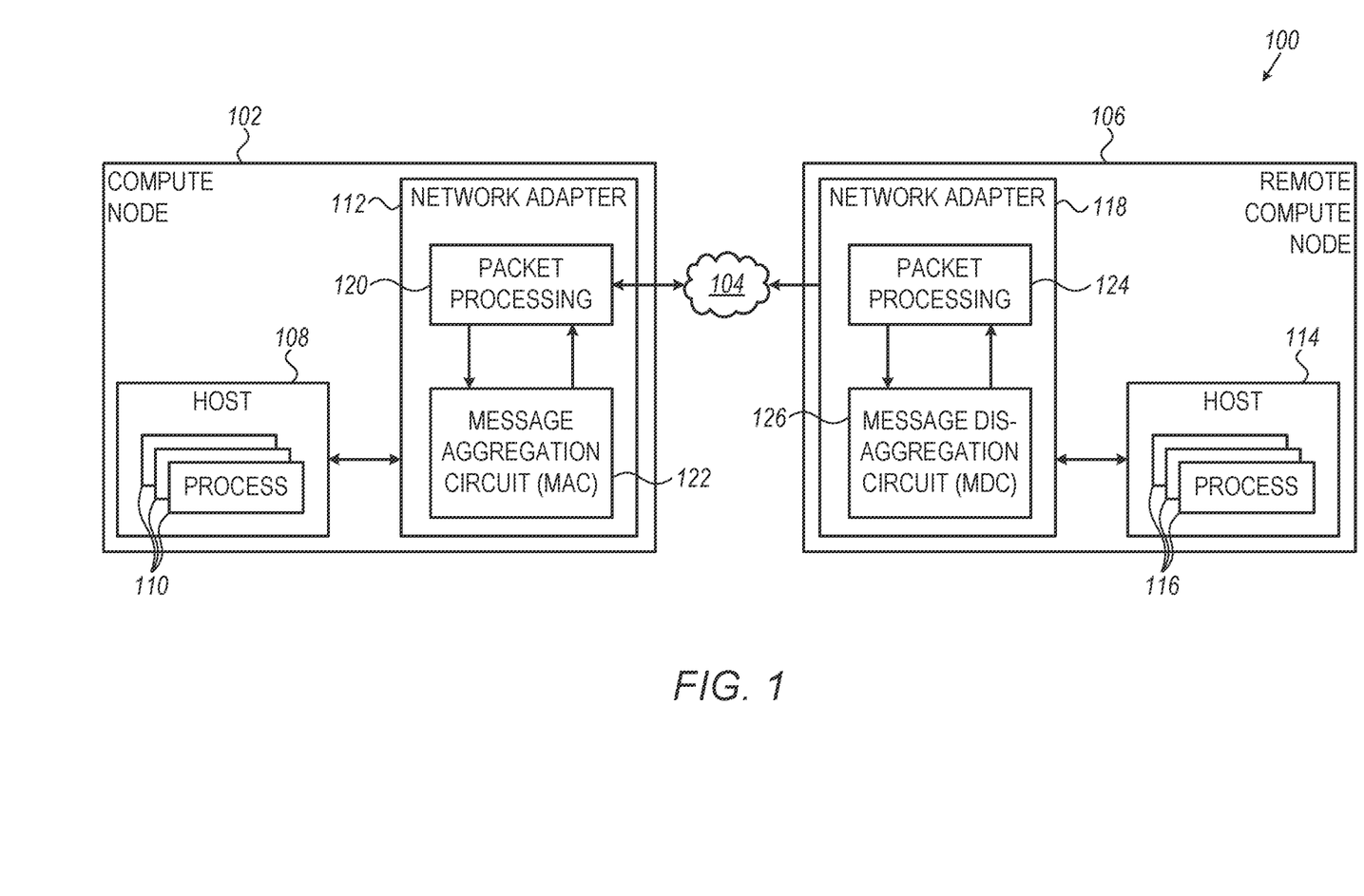
FIG. 1 is a block diagram that schematically illustrates a Parallel-Computing System, in which a plurality of compute nodes exchange messages over a communication network.

FIG. 1 is a block diagram that schematically illustrates a Parallel-Computing System 100, in which a plurality of compute nodes exchange messages over a communication network. The Parallel-Computing System comprises a Compute Node 102, a Communication Network 104 (e.g., InfiniBand™ (IB), or Ethernet) and a Remote Compute Node 106, wherein both compute nodes 102 and 106 (and typically many other compute nodes that are not shown) are coupled to each other through the communication network. Compute Node 102 comprises a Host Processor 108 that runs parallel computing processes 110 and a Network Adapter 112 that is configured to communicate messages over the communication network with peer compute nodes, including Remote Compute Node 106.

Remote Compute Node 106 comprises a Host Processor 114 that runs parallel computing processes 116, and a Network Adapter 118 that is configured to communicate messages over Network 104.

When Parallel-Computing System 100 runs a parallel computing job, processes throughout the system may communicate messages with peer processes. For example, one or more processes 110 running on Host 108 may send messages to one or more processes 116 that run on Host 114. Such messages may be short, and, as the overhead for each message is large (relative to the message size), may adversely affect the system performance if sent separately. As noted above, the process generating a certain message is referred to as the source process of that message, and the process to which the message is destined is referred to as the destination process.

According to the example embodiment illustrated in FIG. 1, Network Adapter 112 comprises processing circuitry (in the present example a Packet Processing circuit 120) and a Message Aggregation Circuit (MAC) 122. When Packet Processing circuit 120 receives, from Host 108, messages to be sent over the communication network, the Packet Processing circuit sends the messages to the MAC. The MAC checks the destination of the messages and may aggregate a plurality of messages that are destined to the same peer host (same destination compute node) into a single aggregated message. The MAC then sends the aggregated message to the Packet-Processing circuit, which communicates the message over the network. Thus, the overhead associated with the sending of a message is shared between a plurality of messages, mitigating the ensuing performance degradation.

In some embodiments, when the MAC aggregates multiple messages having the same destination, the MAC may strip-off the common destination fields of the messages (sending a single destination header instead), and possibly strip-off additional header fields. Typically, however, the MAC will not strip-off header fields that are not shared by the individual messages; e.g., source identification (when relevant).

At the destination, Network Adapter 118 of Remote Compute Node 106 comprises a Packet Processing circuit 124 and a Message Disaggregation Circuit (MDC) 126. The Packet Processing circuit sends ingress messages to the MDC. If any message is aggregated, the MDC reconstructs the original messages by disaggregating the aggregated message to separate messages, and then sends the messages back to the Packet Processing circuit, which may send the messages to Host 114.

As would be appreciated, Network Adapters 112 and 118 illustrated in FIG. 1 and described hereinabove are shown by way of example. In alternative embodiments, for example, any or both Network Adapters 112 and 118 may comprise a MAC and an MDC, for bidirectional communication of aggregated messages. In some embodiments, aggregation of read operations is supported—both the source and destination network adapters comprise MDCs; read requests are aggregated into a single message; at the target network adapter multiple read responses are aggregated into a single message that is processed at the target, and then disaggregated when arriving back at the source network adapter. In such embodiments, additional messages may be aggregated at the source network adapter together with the multiple read requests.

Moreover, the aggregation (grouping) of read responses at the target network adapter may differ from the original aggregation (grouping) of read requests at the source network adapter. In one simplified example, the source network adapter may aggregate two requests "req0" and "req1" into an aggregated message and send a third requests "req2" individually. In response, the target network adapter may send a response to req0 (denoted "res0") individually, and aggregate the responses to req1 and req2 (denoted "res1" and "res2") in an aggregated response message.

In embodiments, atomic read and writes may also be aggregated. In yet other embodiments, multiple transaction types may be combined to a single aggregated message.

In an embodiment, The MAC may be implemented as a separate dedicated block on a device (e.g., a processor (such as a CPU or GPU) or an FPGA) connected to a standard network adapter that does not include a MAC. In some embodiments a single process may run on Host 114. In an embodiment, a single process runs on Host 108, and the MAC aggregates messages that the single process generates (and are destined to the same Remote Compute Node). In some embodiments, Compute Node 102 and/or Compute Node 106 comprise more than one Host and/or more than one Network Adapter; in an embodiment, processes 110 may run on a peer device such as a GPU or an FPGA.

In an embodiment, Packet Processing circuit 124 detects aggregated messages, and sends to the MDC only packets that need to be disaggregated. In another embodiment, MDC 126 sends the disaggregated messages directly to Host 114.

Figure 2:
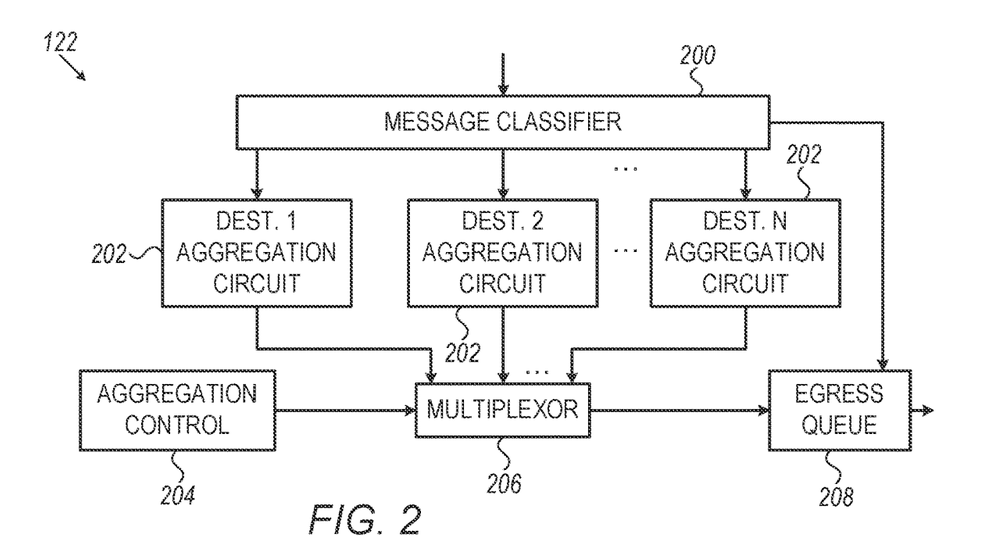
FIG. 2 is a block diagram that schematically illustrates a Message-Aggregation Circuit (MAC), in accordance with an embodiment of the present invention.

FIG. 2 is a block diagram that schematically illustrates Message-Aggregation Circuit (MAC) 122, in accordance with an embodiment of the present invention. The MAC comprises a Message Classifier 200, which is configured to classify messages according to destinations; a plurality of Aggregation Circuits 202, which may be allocated to aggregate messages for given destinations; an Aggregation Control circuit 204, which is configured to control the aggregation; a Multiplexor 206, which is configured to select an aggregated message from the plurality of Aggregation Circuits 202; and, an Egress Queue 208, which is configured to temporarily store aggregated messages until the messages are handled by Packet-Processing 120 (FIG. 1).

The Message Classifier receives messages to specified destinations from the packet processing circuit, and checks if the messages should and could be aggregated (examples to messages that should not be aggregated and to messages that cannot be aggregated will be described hereinbelow, with reference to FIG. 3). If the message should not or cannot be aggregated, the Message Classifier sends the message directly to Egress Queue 208. If the message should and could be aggregated, the Message Classifier sends the message to one of Aggregation Circuits 202 that is allocated to messages with the destination specified for the current message, or, if no Aggregation Circuit is allocated to the specified destination, the Message Classifier allocates a free Aggregation Circuit and sends the message thereto.

Aggregation Circuits 202 are configured to store aggregated messages. Typically, the Aggregation Circuit adds metadata to the message, e.g., to specify message boundaries. When a new message is to be added to an aggregated message, the Aggregation Circuit adds the new message to the stored aggregated message and may modify the metadata accordingly. In embodiments, an Aggregation Circuit that aggregates messages with a specified destination is marked with the destination ID.

Aggregation Control circuit 204 is configured to determine if any of the Aggregation Circuits should be deallocated (e.g., emptied and made ready to be reallocated). (Example criteria for this decision will be described hereinbelow, with reference to FIG. 4.) The Aggregation Control circuit controls Multiplexor 206 to forward the aggregated message from the Aggregation Circuit that is to be deallocated to Egress Queue 208, which, in turn, sends the aggregated messages to the Packet Processing circuit.

In summary, Message-Processing circuit 122 receives messages from Packet Processing circuit 120 and stores some of the messages in Aggregation Circuits which are allocated to specified message destinations. An Aggregation Control circuit empties the Aggregation Circuits through a Multiplexor and an Egress Queue, the latter sending aggregated messages back to the Packet Processing circuit. The number of aggregated messages may be smaller than the number of the non-aggregated messages, improving overall performance.

As would be appreciated, the message aggregation circuit structure illustrated in FIG. 2 and described hereinabove is cited by way of example; the present invention is by no means limited to the described embodiment. In alternative embodiments, for example, there is no Egress Queue, and the MAC sends the aggregated messages directly to buffers in the Packet Processing circuit. In an embodiment, Message Classifier 200 and/or Aggregation Control circuit 204 are distributed in the Aggregation Circuits.

Figure 3:
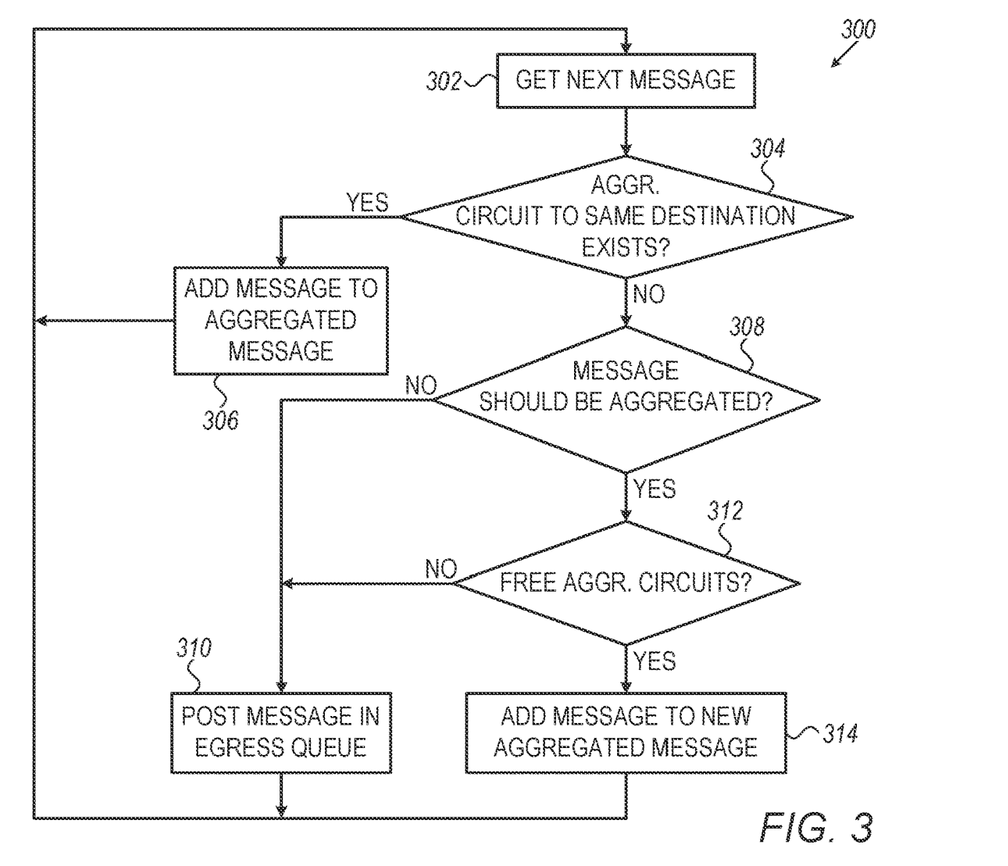
FIG. 3 is a flowchart that schematically illustrates a method for sending messages to aggregation circuits, in accordance with an embodiment of the present invention.

FIG. 3 is a flowchart 300 that schematically illustrates a method for sending messages to Aggregation Circuits, in accordance with an embodiment of the present invention.

The flowchart may be executed, for example, by Message Classifier 200 (FIG. 2). The flowchart starts at a Get-Next-Message step 302, wherein the Message Classifier receives a message from Packet Processing circuit 120 (FIG. 1). The message specifies a destination to which the message should be sent. The Message Classifier then, in a Check-if-Aggregation-Circuit-Exists, checks if the destination ID of one of aggregation circuits 202 (FIG. 2) matches the specified destination. If so, the Message Classifier enters an Add-Message step 306, and sends the message to the corresponding Aggregation Circuit.

If, in step 304, there is no Aggregation Circuit with a destination ID matching the specified destination, the Message Classifier will enter a Check-Aggregation-Needed step 308, and check if the message should be aggregated. In some embodiments, only messages to predefined destinations should be aggregated; in an embodiment, predefined ranges of destination may be defined, and any message to a destination that is not within the specified range should not be aggregated. In another embodiment, aggregation is a property of the egress queue; In some other embodiments, messages with size exceeding a predefined threshold should not be aggregated, and in yet other embodiments an application may indicate which messages should (or should not) be aggregated, and when the aggregation should stop.

If, in step 308, the message should not be aggregated, the Message Classifier enters a Post-Message step 310, and posts the message in Egress Queue 208 (FIG. 2). If (in step 308), the message should be aggregated, the Message Classifier enters a Check-Free-Aggregation-Circuit step 312 and checks if there are Aggregation Circuits 202 (FIG. 2) that are not allocated. If so, the Message Classifier, in an Add-Message-New step 314, allocates an available Aggregation Circuit to the specified destination and sends the message to the new Aggregation Circuit. If, in step 312, there are no available Aggregation Circuits, the Message Classifier enters Post-Message step 310, and sends the message to the Egress Queue (in some embodiments, if no aggregation circuit is available, the message is temporarily stored in an Ingress Queue or in a dedicated queue.

After either step 306 or step 310, the Message Classifier reenters step 302, to handle the next message.

Figure 4:
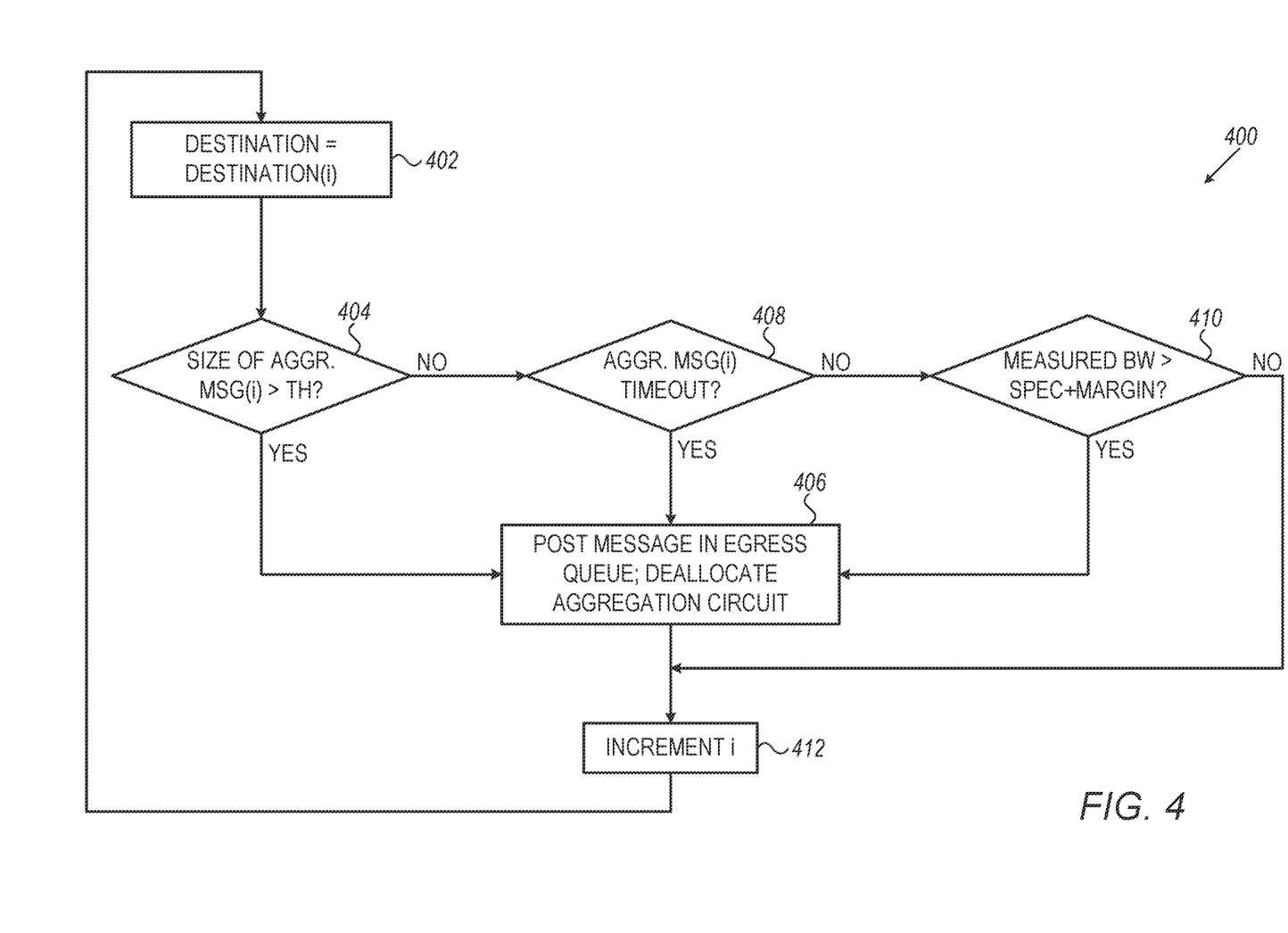
FIG. 4 is a flowchart that schematically illustrates a method for deallocation and emptying aggregation circuits, in accordance with an embodiment of the present invention.

FIG. 4 is a flowchart 400 that schematically illustrates a method for deallocating and emptying Aggregation Circuits, in accordance with an embodiment of the present invention. The flowchart is executed by Aggregation Control circuit 204 (FIG. 2), which checks the aggregated messages against deallocation criteria. The flowchart starts at a Set Destination step 402, wherein the Aggregation Control circuit defines the destination-ID of the aggregation circuit to be checked, according to an index i. Next, in a Check-Size step 404, the Aggregation Control circuit checks the Aggregation Circuit (with destination ID equals to destination (i)) against a message size criterion. For example, the accumulated size of the aggregated message is compared to a predefined threshold. If the message size is greater than the threshold, the Aggregation Control circuit enters a Post-Message step 406, wherein the Aggregation Control circuit posts the aggregated message that is stored in the aggregation circuit in the Egress Queue, and deallocates the aggregation circuit. In another example, an aggregation termination request may be embedded in the message.

If, in step 404, the aggregated message is not greater than the preset threshold, the Aggregation Control circuit enters a Check-Timeout step 408, and checks if a preset time limit, measured from the time in which the Aggregation Circuit was allocated, has been reached. In some embodiments, step 408 is useful to guarantee a maximum latency specification. If the preset time limit has been reached, the Aggregation Control circuit enters Post-Message step 406, to post the message and reallocate the Aggregation Control circuit. If, in step 408, the time limit has not been reached, the Aggregation Control circuit enters a Check-Bandwidth step 410. In some embodiments, a minimum bandwidth is specified, and message aggregation should guarantee a bandwidth equal to or greater than the specified minimum. In an embodiment, the bandwidth is measured and, if the specified minimum is met, the aggregation may be relaxed (e.g., to shorten the latency). In step 410, if the measured bandwidth is more than a predefined threshold, (which is typically higher than the specified minimum bandwidth by some margin), the Aggregation Control circuit enters Post Message step 406. If, in step 410, the bandwidth is not higher (or not sufficiently higher) than the specified minimum, all deallocation criteria are not met, and the Aggregation Control circuit enters an Increment-i step 412 to increment the destination index, and then reenters step 402, to check the next Aggregation Circuit (the Aggregation Control circuit also enters step 412 after post-message step 406).

As would be appreciated, flowcharts 300 and 400, illustrated in FIGS. 3, 4 and described above, are example embodiments that are depicted merely for the sake of conceptual clarity. Other flowcharts may be used in alternative embodiments. For example, the order of checks 304, 308, 312 (FIG. 3) and of checks 404, 408, 410 (FIG. 4) may be different; in some embodiments, Packet Processing circuit 120 sends to MAC 122 only messages that may be aggregated, and, hence, step 308 (FIG. 3) may not be needed. In other embodiments, the classification and/or the aggregation-control circuits are distributed in the Aggregation Circuits, and the flowchart is replaced by suitable independent flowcharts for each of the Aggregation Circuits.

Hierarchical Aggregation

In the description hereinabove, messages with shared destination may be aggregated. In some embodiments, messages within the aggregated message may be further aggregated, according to criteria other than destination ID, for further performance improvement. For example, an aggregated message to processes in a remote host may comprise messages to the same process running in the host. In some embodiments, messages to the same process are further aggregated within the aggregated message to the host, saving overhead in the destination (such secondary aggregation is also referred to as "aggregated message compression").

In some embodiments, data that is written to neighboring segments in a memory of the destination processor may be aggregated; e.g., a message to write data in addresses 0-63 may be aggregated with a message to write data in addresses 64-127, to form a message that writes data in addresses 0-127 (within the aggregated message to the host).

Next-Hop Aggregation

In some embodiments of the present invention, messages are aggregated based on the next hop node in the message propagation. For example, if a Compute Node sends messages to a plurality of different peer computers, but a group of messages are routed through a first shared switch ("first hop"), the compute node may aggregate messages that share the same first hop. The switch will comprise a disaggregation circuit, to disaggregate the messages, and forward the disaggregated messages to their destinations. In some embodiments, the switch may comprise a message aggregation circuit, to aggregate egress messages, including disaggregated messages sent from the previous hop and other messages. In embodiments, multiple switches may comprise disaggregation and aggregation circuits and, hence, message aggregation and disaggregation is distributed in both the network adapters and the network switches of the parallel computing system.

In some embodiments, the network adapters may be partially synchronized by sending messages to similar destinations at similar time slots—this increases the probability that the messages will be aggregated at the next hop within a given timeframe.

Figure 5:
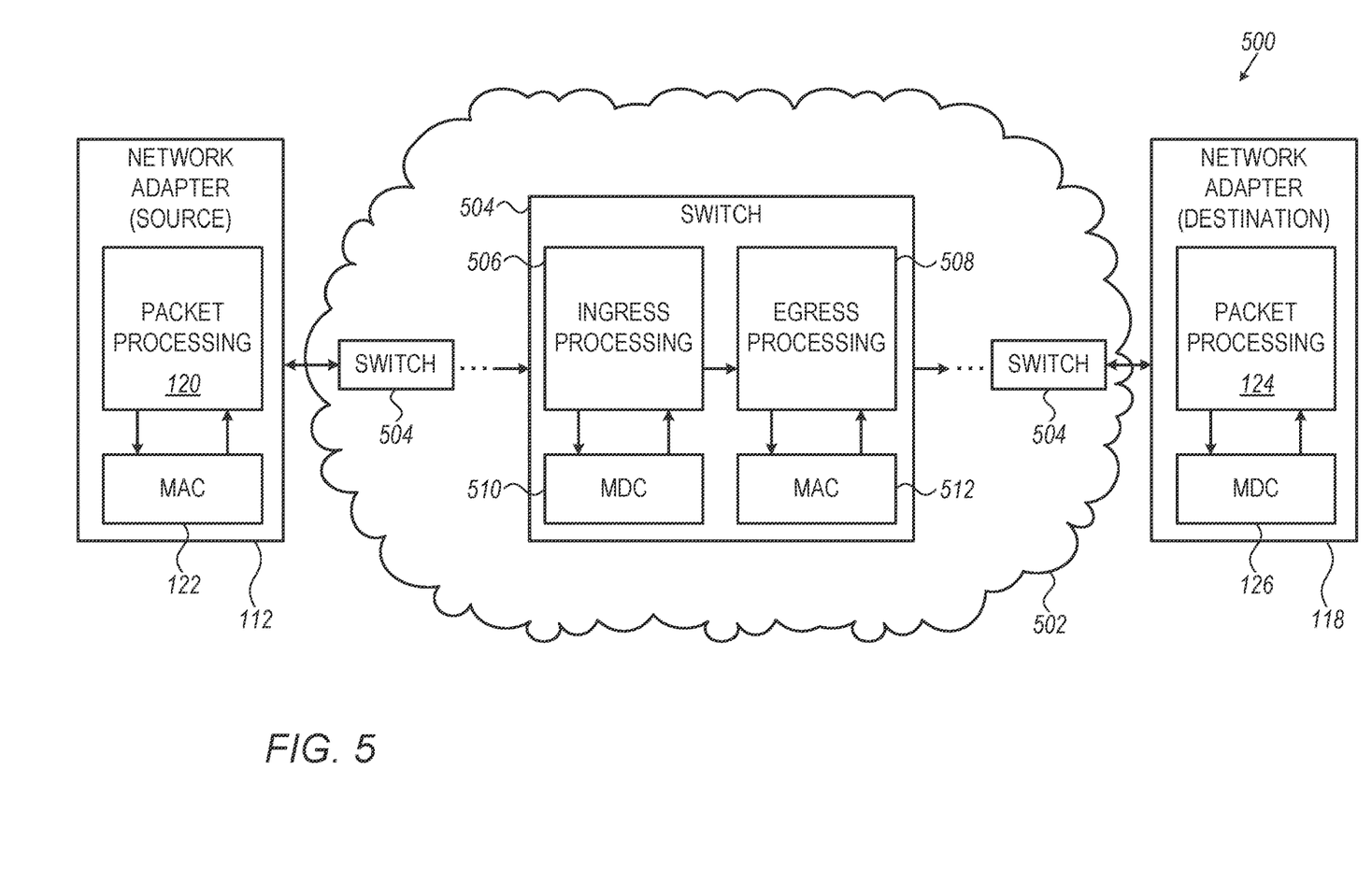
FIG. 5 is a block diagram that schematically illustrates the structure of a parallel computing system, with distributed message aggregation and disaggregation, in accordance with an embodiment of the present invention.

FIG. 5 is a block diagram that schematically illustrates the structure of a parallel computing system 500, with distributed message aggregation and disaggregation, in accordance with an embodiment of the present invention. Source Network Adapter 112, comprising Packet Processing circuit 120 and Message Aggregation Circuit 122, communicates messages with Destination Network Adapter 118, which comprises Packet Processing circuit 122 and Message Disaggregation Circuit 126 (all defined and described with reference to FIG. 1). The messages transverse through a Communication Network 502, comprising fabric and Switches 504. Each Switch 504 comprises an Ingress Processing circuit 506, which is configured to process ingress packets, and an Egress Processing circuit 508, which is configured to process egress packets. When the switch receives an aggregated message from an upstream switch (or, for the first switch, from the Source Network Adapter), the switch may disaggregate the message if the switch is the destination of the aggregated message (typically in a next-hop aggregation). If so, Ingress Processing 506 sends the aggregated message to a Message Disaggregation Circuit (MDC) 510, which disaggregates the message and sends a plurality of disaggregated messages back to Ingress Processing 506.

Switch 506 may comprise a Message Aggregation Circuit 512, which is configured to aggregate egress messages. According to the example embodiment illustrated in FIG. 5, Egress Processing circuit 508 sends egress messages to MAC 512, which may aggregate messages, based on same-next-hop and/or same destination, and send the aggregated messages back to Egress Processing 508, which communicates the aggregated messages to the next hop. (It should be noted that next-hop aggregation may only be applied if the next hop switch comprises a disaggregation circuit.)

As would be appreciated, the structure of switch 504, illustrated in FIG. 5 and described hereinabove, including MDC 510 and MAC 512, is cited by way of example; other structures may be used in alternative embodiments. For example, in some embodiments, the switch does not comprise an MDC (and, hence, does not support next-hop aggregated ingress messages). In other embodiments, the switch does not comprise a MAC, and does not aggregate egress messages (it does, however, relay aggregated ingress messages). In some embodiments, a mix of switches may be used, with varying disaggregation and aggregation capabilities.

In various embodiments, aggregation is carried out in various communication layers, such as Transport layer, Network layer and Link layer, wherein deeper layer may results in more efficient aggregation. For example, when aggregating at the Transport layer, network acknowledgment now acknowledges completion of work posted by multiple processes; the MAC needs to record which of the multiple per-process work requests were completed by the single acknowledgement.

In an embodiment, aggregation may include out-of-order completion; in this case the MAC should complete the aggregation only when receiving a sequence of completions; or else report out-of-order to the requesting source.

It should be mentioned that aggregation and disaggregation may be used for both one-sided Remote-Direct-Memory-Access (RDMA) transactions and for message SEND operations; note, though, that address aggregation may not be applicable to a SEND operation, which may not have an associated address. Some messages (e.g., RDMA READ and WRITE) may be regarded as "address-based" in which case the aggregation, too, may be based on addresses of the messages. Other messages may not be address-based.

The configuration of Network Adapters 112 and 118, and their components, e.g., MAC 122, MDC 126; the components of MAC 122 (e.g., Message Classifier 200, Aggregation Circuits 202, Aggregation Control 204, Multiplexor 206 and Egress Queue 208); and the methods of flowcharts 300 and 400, illustrated in FIGS. 1 through 5, are example configurations and flowcharts that are depicted purely for the sake of conceptual clarity. Any other suitable configurations and flowcharts can be used in alternative embodiments. The network adapters, switches and components thereof may be implemented using suitable hardware, such as in one or more Application-Specific Integrated Circuit (ASIC) or Field-Programmable Gate Arrays (FPGA), using software, using hardware, or using a combination of hardware and software elements.

In some embodiments, Host 108, Host 114, and certain elements of the Network Adapters and the Switches may be implemented using one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Although the embodiments described herein mainly address message aggregation in parallel computing systems, the methods and systems described herein can also be used in other applications, such PCIe and/or CXL tunneling.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network switch, comprising:
   one or more ports, for connecting to a communication network;
   processing circuitry, configured to communicate messages over the communication network via the one or more ports; and
   a message aggregation circuit (MAC), which is configured to:
   receive messages, which originate in one or more source processes, and, are destined to one or more destination processes;
   aggregate two or more of the received messages, that are received over two or more different ones of the ports from the communication network, and which share a common destination, and comprising respective fields specifying the common destination, into an aggregated message by joining the two or more received messages, including removing the fields specifying the common destination from the two or more received messages, and including in the aggregated message a single header indicative of the common destination, the single header replacing the removed fields; and
   send the aggregated message using the processing circuitry, via one of the ports to the communication network en-route to the common destination.

2. The network switch according to claim 1, further comprising a host interface for connecting to one or more local processors, wherein the MAC is configured to receive one or more of the messages from the one or more local processors over the host interface.

3. The network switch according to claim 1, wherein the MAC is configured to receive one or more of the messages from one or more remote processors over the communication network, via the ports.

4. The network switch according to claim 1, wherein the two or more messages share a common destination network node, and wherein the MAC is configured to cause the processing circuitry to send the aggregated message to the common destination network node.

5. The network switch according to claim 1, wherein the two or more messages share a common destination path via the network, and wherein the MAC is configured to cause the processing circuitry to send the aggregated message to the common destination path.

6. The network switch according to claim 1, wherein the MAC is configured to compress the messages by joining messages that are destined to neighboring address ranges defined in the common destination.

7. The network switch according to claim 1, wherein the MAC is configured to terminate aggregation of the aggregated message responsive to expiry of a timeout.

8. The network switch according to claim 1, wherein the MAC is configured to terminate aggregation of the aggregated message responsive to a total size of the aggregated message reaching a predefined limit.

9. The network switch according to claim 1, wherein the MAC is configured to aggregation of the aggregated message responsive to receiving an aggregation termination request.

10. The network switch according to claim 1, wherein the MAC is configured to aggregate the messages as part of transport-layer processing.

11. The network switch according to claim 1, wherein the messages comprise at least read requests, and wherein the MAC is configured to:
    aggregate at least the read requests into the aggregated message; and
    upon receiving one or more aggregated responses in response to the aggregated message, disaggregate the one or more aggregated responses at least into multiple read responses that correspond to the read requests.

12. The network switch according to claim 11, wherein the MAC is configured to aggregate in the aggregated message one or more additional messages in addition to the read requests.

13. The network switch according to claim 1, wherein the messages comprise at least one message type selected from a group of types consisting of:
    Remote Direct Memory Access (RDMA) READ messages;

RDMA WRITE messages; and
RDMA ATOMIC messages.

14. A network switch, comprising:
one or more ports, for connecting to a communication network;
processing circuitry, configured to communicate messages over the communication network via the one or more ports; and
a message disaggregation circuit (MDC), which is configured to:
receive from the processing circuitry an aggregated message that was received from the communication network via one of the ports, the aggregated message, which was formed by joining two or more messages originating in one or more source processes and destined to multiple destination processes;
disaggregate the aggregated message into the two or more messages which were previously joined, by separating each of the previously joined messages and reconstructing each separated message into its original message, and including in the separated original message the original field specifying the destination; and
send the two or more separated messages via two or more different ones of the ports to the communication network, en-route to the multiple destination processes.

15. The network switch according to claim 14, wherein the MDC is configured to disaggregate the aggregated message as part of transport-layer processing.

16. The network switch according to claim 14,
wherein the aggregated message comprises at least read requests;
wherein the MDC is configured to disaggregate the aggregated message into at least the read requests;
and wherein the apparatus further comprises a message aggregation circuit (MAC) configured to receive read responses corresponding to the read requests, to aggregate the read responses into one or more aggregated responses, and to send the one or more aggregated responses using the processing circuitry over the communication network.

17. The network switch according to claim 16, wherein the MAC is configured to group the read responses in the one or more aggregated responses in a grouping that differs from the grouping of the read requests in the aggregated message.

18. The network switch according to claim 14, wherein the messages comprise at least one message type selected from a group of types consisting of:
Remote Direct Memory Access (RDMA) READ messages;
RDMA WRITE messages; and
RDMA ATOMIC messages.

19. A method of switching, comprising:
communicating messages, which originate in one or more source processes and are received from at least two ports, and which are destined to one or more destination processes, over a communication network;
aggregating two or more of the received messages, that are received over two or more different ones of the ports and share a common destination, and comprising respective fields specifying the common destination, into an aggregated message by joining the two or more received messages, including removing the fields specifying the common destination from the two or more received messages, and including in the aggregated message a single header indicative of the common destination, the single header replacing removed fields; and
sending the aggregated message over the communication network, via one of the ports to the communication network en-route to the common destination.

20. The method according to claim 19, and comprising receiving one or more of the messages from one or more local processors over a host interface.

21. The method according to claim 19, and comprising receiving one or more of the messages from one or more remote processors over the communication network.

22. The method according to claim 19, wherein the two or more messages share a common destination network node, and wherein sending the aggregated message comprises sending the aggregated message to the common destination network node.

23. The method according to claim 19, wherein the two or more messages share a common destination path via the network, and wherein sending the aggregated message comprises sending the aggregated message to the common destination path.

24. The method according to claim 19, wherein aggregating the messages comprises compressing the messages by joining messages that are destined to neighboring address ranges defined in the common destination.

25. The method according to claim 19, wherein aggregating the messages comprises terminating aggregation of the aggregated message responsive to expiry of a timeout.

26. The method according to claim 19, wherein aggregating the messages comprises terminating aggregation of the aggregated message responsive to a total size of the aggregated message reaching a predefined limit.

27. The method according to claim 19, wherein aggregating the messages comprises terminating aggregation of the aggregated message responsive to receiving an aggregation termination request.

28. The method according to claim 19, wherein aggregating the messages is performed as part of transport-layer processing.

29. The method according to claim 19, wherein the messages comprise at least read requests, wherein aggregating the messages comprises aggregating at least the read requests into the aggregated message, and wherein the method further comprises, upon receiving one or more aggregated responses in response to the aggregated message, disaggregating the one or more aggregated responses at least into multiple read responses that correspond to the read requests.

30. The method according to claim 29, wherein aggregating the messages comprises aggregating in the aggregated message one or more additional messages in addition to the read requests.

31. The method according to claim 19, wherein the messages comprise at least one message type selected from a group of types consisting of:
Remote Direct Memory Access (RDMA) READ messages;
RDMA WRITE messages; and
RDMA ATOMIC messages.

32. The method according to claim 19, wherein communicating and aggregating the messages are performed in a network device.

33. A method of switching, comprising:
communicating messages over a communication network, including receiving an aggregated message, which was aggregated by joining two or more messages originating in one or more source processes, received over the communication network via one port of a plurality of ports, and destined to one or more destination processes;

disaggregating the aggregated message by separating the previously joined two or more messages into the two or more messages and reconstructing each separated message into its original message, and including in the separated original message the original field specifying the destination; and sending the two or more separated messages via at least two of the plurality of ports to the communication network en-route to the one or more destination processes.

34. The method according to claim 33, wherein disaggregation of the aggregated message is performed as part of transport-layer processing.

35. The method according to claim 33,
wherein the aggregated message comprises at least read requests;
wherein disaggregating the aggregated message comprises disaggregating the aggregated message into at least the read requests;
and wherein the method further comprises receiving read responses corresponding to the read requests, aggregating the read responses into one or more aggregated responses, and sending the one or more aggregated responses over the communication network.

36. The method according to claim 35, wherein aggregating the read responses comprises grouping the read responses in the one or more aggregated responses in a grouping that differs from the grouping of the read requests in the aggregated message.

37. The method according to claim 33, wherein the messages comprise at least one message type selected from a group of types consisting of:
Remote Direct Memory Access (RDMA) READ messages;
RDMA WRITE messages; and
RDMA ATOMIC messages.

38. The method according to claim 33, wherein communicating the messages and disaggregating the aggregated message are performed in a network device.

39. The network switch according to claim 1, wherein the MAC is configured to aggregate the messages as part of an out-of-order completion processing.

40. The network switch according to claim 14, wherein the MDC is configured to disaggregate the aggregated message as part of the out-of-order completion processing.

* * * * *